United States Patent [19]

Nakayama et al.

[11] Patent Number: 5,154,900
[45] Date of Patent: Oct. 13, 1992

[54] METHOD FOR PURIFYING HIGH-TEMPERATURE REDUCING GAS

[75] Inventors: Toshio Nakayama; Hiromi Shirai; Makoto Kobayashi, all of Kanagawa; Mitsugi Suehiro, Tokyo; Toru Seto, Hiroshima; Shigeaki Mitsuoka, Hiroshima; Kenji Inoue, Hiroshima, all of Japan

[73] Assignees: Mitsubishi Jukogyo Kabushiki Kaisha; Central Research Institute of Electric Power Industry, both of Tokyo, Japan

[21] Appl. No.: 721,912

[22] Filed: Jun. 20, 1991

Related U.S. Application Data

[63] Continuation of Ser. No. 308,098, Feb. 8, 1989, abandoned.

[30] Foreign Application Priority Data

Feb. 10, 1988 [JP] Japan .................. 63-27441
Sep. 14, 1988 [JP] Japan .................. 63-228383

[51] Int. Cl.$^5$ .................................. B01D 53/34
[52] U.S. Cl. ............................ 423/230; 423/231
[58] Field of Search ............... 423/230, 231, 574 R

[56] References Cited

U.S. PATENT DOCUMENTS

| | | | |
|---|---|---|---|
| 1,822,293 | 9/1931 | Joseph .................. | 423/230 |
| 2,747,968 | 5/1956 | Pigache ................. | 423/230 |
| 4,164,544 | 8/1979 | Olsson et al. .......... | 423/230 |
| 4,371,507 | 2/1983 | Farha, Jr. et al. ..... | 423/231 |
| 4,533,529 | 8/1985 | Lee ....................... | 423/230 |

OTHER PUBLICATIONS

*Chemical Engineering Techniques*, Lauer et al., Reinhold Publ. Corp. 1952, pp. 220–222.
*Unit Processes and Principles of Chemical Engineering*, Olsen, D. Van Nostrand Co., Inc. 1932, pp. 1–3.

Primary Examiner—Jeffrey E. Russel
Attorney, Agent, or Firm—McAulay Fisher Nissen Goldberg & Kiel

[57] ABSTRACT

In a method for absorbing and removing sulfur compounds such as hydrogen sulfide and carbonyl sulfide present in a high-temperature reducing gas using an absorbent, disclosed is a method for purifying a high-temperature reducing gas which is characterized in that: said method uses at least four towers of reactors filled with an absorbent and comprises four steps which are an absorption step for absorbing and removing sulfur compounds with an absorbent, a regeneration step for regenerating said absorbent using a gas containing oxygen, a cooling step after the regeneration step, and a reduction step for reducing said regenerated and cooled absorbent with a high-temperature reducing gas until the concentration of the reducing gas becomes uniform before and after passing through the absorbent; heat is continuously recovered from the high-temperature gas at the outlet of the regeneration reactor in said regeneration step; and the regeneration and absorption performance is thus stabilized.

Also disclosed is a method for purifying a high-temperature reducing gas which is characterized in that this method uses as least four towers filled with an absorbent as in the above method; and an additional preliminary regeneration step is provided besides the above four steps in order to make possible a smooth operation when switching to the regeneration step and the continuous recovery of sulfur.

2 Claims, 4 Drawing Sheets

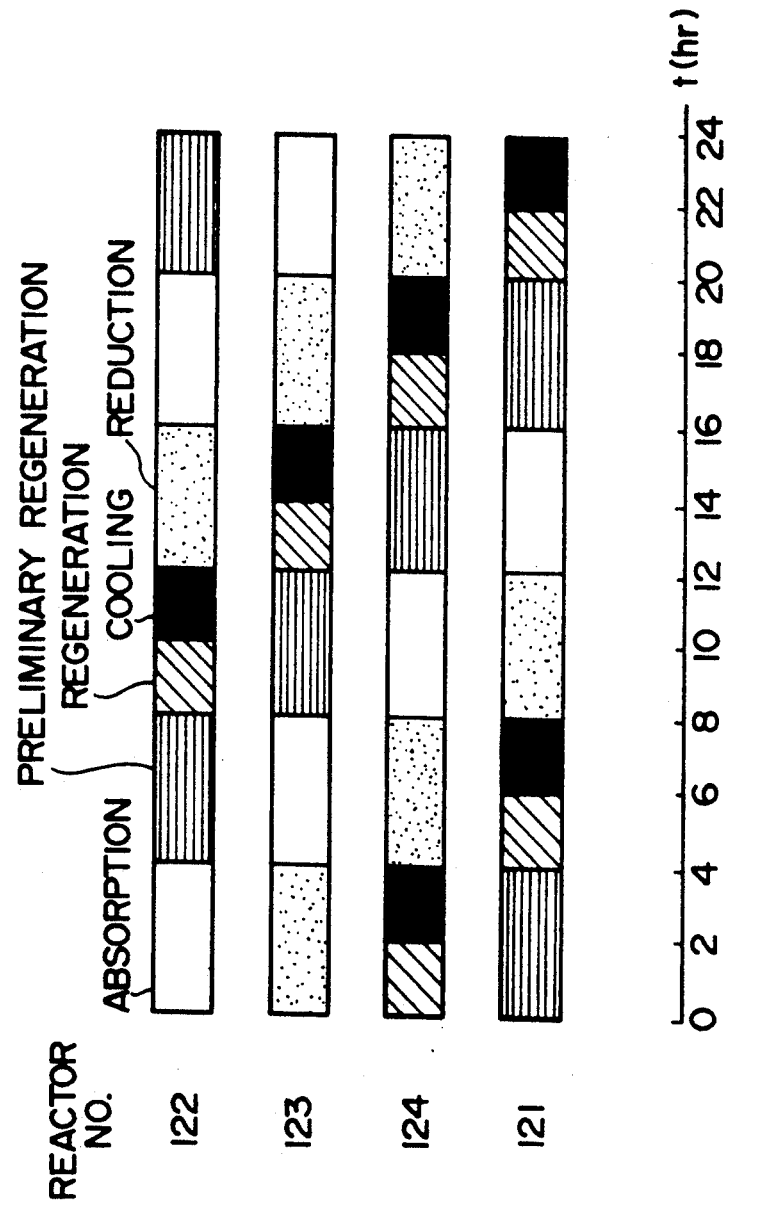

METHOD FOR PURIFYING HIGH-TEMPERATURE REDUCING GAS

This is a continuation of application Ser. No. 07/308,098, filed Feb. 8, 1989, now abandoned.

FIELD OF THE INVENTION AND RELATED ART STATEMENT

The present invention relates to methods for purifying a high-temperature reducing gas. For example, it relates to methods for efficiently removing sulfur compounds such as hydrogen sulfide and carbonyl sulfide from a high-temperature reducing gas produced in a coal gasification process.

In recent years, as a result of the exhaustion of petroleum resources and the rise in its prices, much attention has been paid to various fuels (or raw materials) and utilization techniques of coals and heavy oils (tar sand, shale oil, Maya crude oil, Chinese Taikei Crude oil, residual oil under reduced pressure, and the like) have been developed. However, resulting gasified product gases contain several hundreds to several thousands ppm of sulfur compounds such as hydrogen sulfide ($H_2S$), carbonyl sulfide (COS) and the like depending on the kind of starting materials such as coal or heavy oil used. These sulfur compounds have to be removed in order to prevent environmental pollution and to prevent devices on the downstream side from corroding.

As a method for the removal of sulfur compounds, a dry method is known to be better economically and otherwise. Because the processes and devices involved are simpler, often used is a method of removing sulfur compounds by letting an absorbent having metal oxides as main components come into contact with the above sulfur compounds at a high temperature and turning the metal oxides into sulfides.

Metal oxides of Fe, Zn, Mn, Cu, Mo and W are used as absorbents and reacted with hydrogen sulfide ($H_2S$), carbonyl sulfide (COS) and the like at a temperature of about 250° to 500° C.

As an example, we show reactions for removing $H_2S$ present in the above high-temperature reducing gas using $Fe_2O_3$; absorption reactions ? proceed as shown by Equations (1) to (4) below.

$$3Fe_2O_3 + H_2 \rightarrow 2Fe_3O_4 + H_2O \quad (1)$$

$$3Fe_2O_3 + CO \rightarrow 2Fe_3O_4 + CO_2 \quad (2)$$

$$Fe_3O_4 + H_2 + 3H_2S \rightarrow 3FeS + 4H_2O \quad (3)$$

$$Fe_3O_4 + CO + 3H_2S \rightarrow 3FeS + 3H_2O + CO_2 \quad (4)$$

Subsequently, the absorbent after absorption is regenerated by a gas containing oxygen and turned into the starting metal oxide back again as shown in Equation (5). By repeating these absorption and regeneration processes, the sulfur compounds in a high-temperature reducing gas is removed as $SO_2$ gas and collected.

$$4FeS + 7O_2 \rightarrow 2Fe_2O_3 + 4SO_2 \quad (5)$$

The absorbent used in this method is one or more of the metal oxides mentioned above by themselves or as carried by a porous material which is heat resistant. In the case of a reactor being a moving bed system, the absorbent is normally shaped into a sphere or an extrusion, and in the case of a fixed bed system the shape is usually a honeycomb.

Since the purified gas prepared by removing the sulfur compounds from a reducing gas such as a coal-gasified gas will be used as an energy source, a manufacturing process which produces a purified gas containing stable concentrations of CO and $H_2$ is preferred. For stable production, the reactions of the above Equations (1) and (2) should be controlled as much as possible. Since in a moving or floating bed system the absorption and regeneration processes are repeated continuously, this can be achieved easily.

In a fixed bed system, however, since the absorption and regeneration processes are repeated intermittently, the concentrations of CO and $H_2$ in the purified gas drop temporarily at the beginning of absorption reactions right after the regeneration. This phenomenon is quite undesirable for a method for purifying a high-temperature reducing gas.

The inventors of the present invention proposed a method for purifying a high-temperature reducing gas which comprises and continuously repeats, in a method of removing sulfur compounds present in a high-temperature reducing gas by absorbing them using an absorbent having metal oxides as main components, the steps of:

regenerating the absorbent which has absorbed the sulfur compounds using a gas containing oxygen;

subsequently reducing the regenerated absorbent using the high-temperature reducing gas until the concentration of the reducing high-temperature gas becomes constant before and after passing the absorbent; and removing sulfur compounds by letting the high-temperature reducing gas pass through the absorbent;

in order to stabilized the concentration of the reducing gases present in the purified gas (Japanese Patent Application No. 85412/1985).

The inventors of the present invention also proposed another method for purifying a high-temperature reducing gas which is characterized in that;

in a method for purifying a high-temperature reducing gas which continuously repeats the steps of absorbing and removing sulfur compounds such as $H_2S$ and COS present in the high-temperature reducing gas with an absorbent filled in reactors by repeating the steps of regenerating the absorbent and absorbing and removing sulfur compounds with the absorbent after reducing the regenerated absorbent until the concentration of the reducing gas at the inlet and outlet of the absorbent layers, said method uses at least three towers of reactors filled with an absorbent and said steps consist of the four steps of absorption, preliminary regeneration, regeneration and reduction;

the performance of the absorption and regeneration steps is stabilized by absorbing and removing sulfur compounds from the high-temperature reducing gas which is passed through the absorbent (Japanese Patent Application No. 167814/1987).

In a method for absorbing and removing sulfur compounds such as $H_2S$ and COS present in a high-temperature reducing gas, the inventors of the present invention also proposed a method for purifying a high-temperature reducing gas which is characterized in that:

said method comprises the four steps of an absorption and removal step for removing the sulfur compounds, a preliminary regeneration step for heating the absorbent having absorbed the sulfur compounds up to a temperature required by regeneration reactions, a regeneration step for regenerating the absorbent which has reached the temperature required by regeneration reactions using a gas containing oxygen, and a reduction step for reducing the regenerated absorbent using the high-temperature reducing gas until the concentration of the reducing gas becomes constant before and after passing through the absorbent; and when the load is low the absorption and regeneration performance is stabilized by controlling the amount of the gas circulated into said regeneration step or by controlling the amount of the reducing gas circulated and using the heat of combustion of the high-temperature reducing gas supplied into said regeneration step (Japanese Patent Application No 167816/1987). 10 The temperature of the gas being treated is normally 300 to 500° C. during an absorption step. During a regeneration step the temperature becomes as high as 500 to 900° C. because of the heat generated by the reaction of the Equation (5) between oxygen ($O_2$) in the gas for regeneration and iron sulfide in the absorbent. The absorbent is thus heated to an abnormally high temperature because it tends to accumulate heat and may be damaged due to the heat. Therefore, a regeneration system which can dissipate or moderate the heat accumulated in the absorbent has been sought after.

In the case of a fixed bed system, the concentration of $O_2$ at the inlet of a regeneration reactor is normally 1 to 3 volume %. If the $O_2$ concentration is raised the amount of the circulating regeneration gas may be reduced inversely proportional to the $O_2$ concentration. Therefore, the equipment in the regeneration system and the consumption of electric power become more economical. On the other hand, however, if the concentration becomes higher than a certain value the undesired effect for the absorbent described above takes place. Therefore, it is not possible to obtain an economical and effective method just by controlling the concentration of $O_2$ at the inlet of a regeneration reactor. A method for purifying a high-temperature reducing gas is required in which a stable absorption and regeneration performance is achieved, and which has a tower switching system which minimizes the load fluctuation of a sulfur recovery system in the downstream.

OBJECT AND SUMMARY OF THE INVENTION

It is an object of the present invention to provide a method to be used in a system in which each of absorption, regeneration and reduction steps is carried out at each tower for resolving the drawbacks of the methods for purifying a high-temperature reducing gas described above. More specifically, the present invention provides a method for moderating the effect of abnormal accumulation in an absorbent of heat generated by regeneration reactions at a regeneration step, and for making the life of the absorbent longer and for stabilizing the absorption and regeneration performance.

That is, the present invention is a method for purifying a high-temperature reducing ga which is characterized in that:

in a method for absorbing and removing sulfur compounds such as hydrogen sulfide and carbonyl sulfide present in a high-temperature reducing gas using an absorbent, said method uses at least four towers of reactors filled With an absorbent and comprises the four steps of an absorption step for absorbing and removing sulfur compounds with an absorbent, a regeneration step for regenerating the absorbent using a gas containing oxygen, a cooling step after the regeneration step, and a reduction step for reducing the regenerated and cooled absorbent with the high-temperature reducing gas until the concentration of the reducing gas becomes uniform before and after passing through the absorbent;

heat is continuously recovered from the high-temperature gas at the outlet of the regeneration reactor in said regeneration step; and the regeneration and absorption performance is stabilized.

When the absorbent is regenerated after absorption to make again for the absorption of sulfur compounds, the following reactions (6) to (9) which produce sulfates tend to occur as the reaction temperature becomes lower. If these sulfates remain in the absorbent clogging its fine pores, they cannot be completely removed even by regeneration at a high temperature, damaging the performance of the absorbent.

$$FeS + 2O_2 \rightarrow FeSO_4 \qquad (6)$$

$$2FeS + SO_2 + 5O_2 \rightarrow Fe_2(SO_4)_3 \qquad (7)$$

$$2Fe_2O_3 + 4SO_2 + O_2 \rightarrow 4FeSO_4 \qquad (8)$$

$$2Fe_2O_3 + SO_2\ 3O_2 \rightarrow 2Fe_2(SO_4)_3 \qquad (9)$$

Therefore, the reaction temperature at the regeneration step has to be high to a certain degree in order to avoid the production of the above sulfates as by-products. However, if the temperature is raised unnecessarily the absorbent is destroyed. It is thus necessary and important to choose the regeneration temperature and the $O_2$ concentration of a gas used for regeneration carefully and improve the regeneration system.

In a continuous desulfurization and regeneration system comprising absorption and regeneration and reduction, various patterns of switching towers can be considered depending on the number of reactors, and the regeneration system is also different. Previously, it has been common to regenerate a reactor which has finished the absorption step independently of the other reactors. In that case, the gas temperature becomes higher near the outlet of the reactor, where the environment is therefore harsh for the absorbent, due to heat transfer and the accumulation of heat in the absorbent. Although a divided regeneration operation can be considered in which the gas is introduced into a reactor at the middle section of the reactor, it is difficult to employ such maneuvering if there is only one tower used as a regeneration reactor. That is, as the regeneration of the absorbent proceeds, the gas at the outlet of the reactor come to contain $O_2$ gas. This $O_2$ gas has to be prevented from mixing into a $SO_2$ reduction reactor that is subsequent to regeneration. Therefore, the management of the regeneration reactor during regeneration and the timing system for switching all the towers including the ones for reduction and absorption become very complicated, and the whole idea appears to be impractical.

The present invention resolves the technical problems described above by providing two towers of regeneration reactors.

The present invention can advantageously moderate the heat accumulation in the absorbent, make the life of an absorbent longer, and control the generation of $SO_2$ gas in a regeneration reactor.

The method of the present invention uses at least four towers of reactors filled with an absorbent, and requires each of absorption, regeneration, cooling and reduction steps to be carried out with a cycle of, for example, 4, 6, 2 and 4 units of times for each respective step. This method is characterized in that two towers of regeneration reactors are provided so that while the cooling step is carried out in one tower, the regeneration step can be carried out in the other, and also the regeneration step can be carried out simultaneously in the two towers a certain period of time during the operation.

That is, a gas containing $O_2$ is introduced into the reactor even during the cooling step after the regeneration has been completed in order to ensure the complete regeneration of the absorbent which finished the absorption step. However, since $O_2$ gas is not necessary for the part of the absorbent which has been sufficiently regenerated, an unreacted portion of the $O_2$ gas comes out of an outlet of the regeneration order to prevent this $O_2$ gas from mixing into the reactor. In order to prevent this $O_2$ gas from mixing into the gas in the sulfur recovery system, this gas containing $O_2$ is introduced to the middle section of the other regeneration reactor.

The gas from an outlet of the reactor in the cooling step which finished the regeneration is thus introduced to the middle section of the other regeneration reactor. To an inlet of the other regeneration reactor, the gas for regeneration has been supplied prior to this introduction. Therefore, there exists a certain period of time during which the gas from the outlet of the reactor in the cooling step and the gas for regeneration are simultaneously supplied into this regeneration reactor. The regeneration proceeds following the series of operations as described above.

Since the temperature of the gas at the outlet of the cooling step, which gas has finished the regeneration and is to be introduced to the middle section of another regeneration reactor, is higher than the gas temperature at the inlet of the other regeneration reactor, the gas is introduced to the other regeneration reactor after it is cooled to a temperature close to the inlet temperature of the other regeneration reactor with a heat exchanger.

Also, according to the above method, since heat is effectively and continuously recovered from the high-temperature gas from the outlet of the regeneration reactor and the heat balance of the entire system of absorption and regeneration can be maintained, the regeneration and absorption performance become stabilized.

In this method for reducing deterioration due to heat, as described above, the temperature of the absorbent can become very high due to the abrupt exothermic reactions at the beginning of the regeneration step when $O_2$ gas is introduced to the two towers of the regeneration reactors. Therefore, the operation of the regeneration step has to be carried out very carefully.

Also, in the regeneration step, as explained above, besides the reaction of Equation (5), the following reactions (7) and (9), for example, can take place in some cases, and part of FeS is converted to iron sulfate {$Fe_2(SO_4)_3$}.

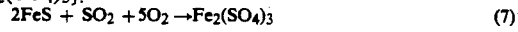  (7)

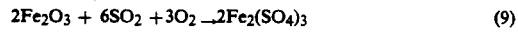  (9)

This by-product $Fe_2(SO_4)_3$ is reduced again to $SO_2$ in the subsequent reduction step according to the reactions (10) and (11) or the like.

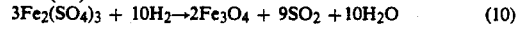  (10)

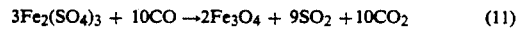  (11)

When this used reducing gas containing $SO_2$ is returned to the absorption reactor, $SO_2$ is absorbed by the absorbent to become FeS following, for example, the reactions below, (12) and (13), in this absorption reactor.

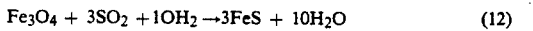  (12)

  (13)

$Fe_3O_4$ reacting in Equations (12) and (13) should instead be used in the absorption of $H_2S$ in Equations (3) and (4) and represents a loss of $Fe_3O_4$ useful in absorbing $H_2S$, reducing the absorption capability.

Also, $H_2$ and CO reacting in Equations (12) and (13) should originally be a raw material for unpurified gas produced by gasification and are a cause of energy losses.

Therefore, the by-product reactions of $Fe_2(SO_4)_3$ such as those in Equations (7) and (9), in particular, should be inhibited as much as possible.

To this end, the regeneration should be carried out at a temperature as high as possible within the higher limit of the temperature at which an absorbent can withstand, and it is necessary that the concentration of $SO_2$ is reduced as much as possible.

As a gas for regenerating the absorbent, a gas processed in the sulfur collection system into which the air or a gas containing oxygen is mixed can be used. Therefore, the efficiency of sulfur collection in the sulfur collection system should be improved, and the sulfur components ($SO_2$, $H_2S$, gaseous sulfur and the like) should be reduced to a minimum in order to control the occurrence of by-product reactions of $Fe_2(SO_4)_3$.

It is also an object of the present invention to resolve the problems such as a rise in the absorbent temperature during the regeneration, a reduction of the absorption capability of an absorbent caused by by-product reactions, and an energy loss associated with $H_2$ and CO in an unpurified gas produced by gasification.

The present invention achieves the above object by using at least four towers of reactors filled with an absorbent, by providing a new preliminary regeneration step prior to a regeneration step, by connecting these two steps in series to carry out regeneration, and by supplying a used reducing gas to a sulfur collection system on the downstream side which used to be returned to the inlet of the absorption reactor.

In a method for absorbing and removing sulfur compounds present in a high-temperature reducing gas with an absorbent, the present invention relates to a method for purifying a high-temperature reducing gas which is characterized in that:

said method uses at least four towers filled with an absorbent;

said method comprises the following five steps, an absorption step for absorbing and removing said sulfur compounds with an absorbent preliminary regeneration and regeneration steps for regenerating the absorbent, a cooling step which takes place after said regeneration step is completed, and a reduction step for reducing the regenerated absorbent until the concentration of the reducing gas becomes the same on the upstream and downstream sides of the absorbent;

said regeneration and preliminary regeneration steps are connected in series to each other, and a line is disposed for mixing a high-temperature gas from an outlet of said regeneration step with a gas from the outlet of said preliminary regeneration step in order to continuously recycle heat of regeneration reactions even when the regeneration step is being switched; and elemental sulfur is recovered by feeding a gas containing $SO_2$ and generated in said preliminary regeneration, regeneration and reduction steps to a sulfur recovery system.

As mentioned above, an abrupt temperature rise may occur because of exothermic reactions if a gas containing $O_2$ is supplied to a reactor and the regeneration step is started immediately after the absorption step is completed.

In order to moderate these exothermic reactions, the following operations are carried out.

The absorption, preliminary regeneration, regeneration and cooling steps are carried out in any of the four towers of reactors at all times. The reactor which finished the absorption step is switched to the subsequent preliminary regeneration step. A gas supplied to the preliminary regeneration step is mostly a gas that passed through the regeneration reactor. At the beginning of the regeneration step, the concentration of $O_2$ in a gas from an outlet of the regeneration reactor is low and becomes higher as the regeneration progresses. Therefore, at the beginning of the preliminary regeneration step the concentration of $O_2$ is relatively low in the gas and becomes higher following the progress of the preliminary regeneration.

The regeneration is thus started at a lower concentration of $O_2$. This is beneficial for the absorbent because the regeneration is soft on the absorbent.

Also, because a gas that has passed through the regeneration step is used, if the temperature of the gas at an regeneration inlet of the preliminary regeneration step is high a cool gas containing $O_2$ whose temperature is about 150° to 300° C. can be supplied to an inlet line of the preliminary regeneration reactor for controlling temperature.

Next, after a certain period of time has elapsed, the preliminary regeneration step is switched to the regeneration step. When a gas for regeneration containing a desired concentration of $O_2$ (1 to 3 volume %) is supplied to the regeneration reactor, no abrupt temperature rise ensues because regeneration has already started in part of the absorbent during the preliminary regeneration step.

Also, if the absorbent is expected to be exposed to a temperature which is beyond the high temperature limit for the absorbent, a cool gas containing no $O_2$ whose temperature is about 150° to 300° C. can be supplied to protect such part of the absorbent from overheating.

That is, by feeding a cool gas containing no $O_2$ whose temperature is approximately 150° to 300° C. and which has already passed through the sulfur recovery system to the relatively hot part of the absorbent filled in the reactor and divided in several layers, and by controlling the amount of the gas fed, the temperature inside the absorbent may be held less than a given value (for example, 800° C.), and therefore the life of the absorbent is extended.

Furthermore, since the preliminary regeneration and regeneration steps are carried out in series when regenerating the absorbent in the present invention, the leakage of a gas containing $O_2$ into the sulfur recovery system on the downstream side, which is often a problem for a regeneration system having two towers in parallel, may be prevented advantageously compared to such two tower systems.

In the case of a regeneration system which has two towers in parallel, rigorous controlling is required because $O_2$ gas tends to appear in an outlet gas as the regeneration progresses. In the present invention, on the other hand, since two towers are always in series operation, $O_2$ gas present in the outlet gas from the cooling step after the regeneration step is completed is used in the preliminary regeneration step, and any oxygen ($O_2$) may be eliminated from the gas to be supplied to the sulfur recovery system on the downstream side.

Also, in terms of heat exchange, the present invention is better than conventional methods.

After the absorption step is finished and right after switching to the preliminary regeneration step, the lowest point during regeneration is marked by the temperature of the inlet gas on the high-temperature side of a heat exchanger placed on the upstream side of the sulfur recovery system. Since the heat of the inlet gas on the high-temperature side of this heat exchanger is used to maintain the temperature (about 400° to 500° C.) of the inlet gas for regeneration, the temperature of the inlet gas of the heat exchanger has to be maintained above a certain temperature (about 450° to 550° C.) and should be held stable.

Therefore, a high-temperature gas from an outlet of the regeneration reactor is mixed into an outlet gas from the preliminary regeneration reactor with a control valve, and the temperature of the inlet gas on the high-temperature side of the heat exchanger may be maintained at a given temperature.

Depending how far the preliminary regeneration and regeneration steps have progressed, the outlet gas temperature at each step varies. By controlling the amount of a high-temperature gas from an outlet of the regeneration step supplied to an outlet line of the preliminary regeneration step, however, the temperature of the inlet gas on the high-temperature side of the heat exchanger can be maintained to be constant, and thus the temperature of the inlet gas to the regeneration reactor may be easily maintained at a given temperature (about 400° to 500° C.) at all times.

Subsequently, after the regeneration step is completed, it is switched to the cooling step. During the regeneration step, while FeS in the absorbent is mostly converted to $Fe_2O_3$, part of it reacts with $SO_2$ gas present in a gas for regeneration to produce by-product iron sulfate $\{Fe_2(SO_4)_3\}$. This $Fe_2(SO_4)_3$ decomposes in the reduction step to generate gaseous $SO_2$. Therefore, the gas containing $SO_2$ after reduction treatment is supplied, together with the gas which has been treated in the preliminary regeneration step, to the sulfur recovery system on the downstream side and treated there.

Although the flow of gas in the reduction step can be a forward flow with respect to the flow in the absorption step, this flow should in fact be made counter to the flow in the absorption step in order to avoid the decomposition of $Fe_2(SO_4)_3$ into $SO_2$.

Furthermore, because the absorbent is sulfurized from the top side of the absorbent in the gas flow during the absorption step, the sulfurization ratio (the ratio of Fe turned to FeS) of the absorbent should be maintained about 10 to 50% in order to hold the concentration of sulfur compounds in the outlet gas below a certain value (for example, 100 ppm).

In addition, the part of the absorbent sulfurized partly becomes iron sulfate $\{Fe_2(SO_4)_3\}$, and $SO_2$ is produced by its decomposition. Therefore, in order also to prevent this SO$_2$ from being reabsorbed in an iron sulfide zone according to the reactions in Equations (12) and (13), a counter flow reduction method is preferred in which the gas for reduction is supplied at a downstream position from the iron sulfide zone and let flow in a zone where a relatively high concentration of Fe$_2$(SO$_4$)$_3$ is found.

The gas cooled down to a given temperature in the heat exchanger on the upstream side of the sulfur recovery system is supplied to the sulfur recovery system. After sulfur is collected from it, the gas is circulated to be used as a gas for regeneration.

Thus, as explained above, the present invention can protect the absorbent, stabilize the absorption and regeneration performance and is an improvement, in these respects and otherwise, over conventional methods.

BRIEF DESCRIPTION OF THE DRAWINGS

FIG. 5 shows a time schedule of the absorption and regeneration cycle in an embodiment of the present invention.

DETAILED DESCRIPTION OF PREFERRED EMBODIMENTS

Figure 1:
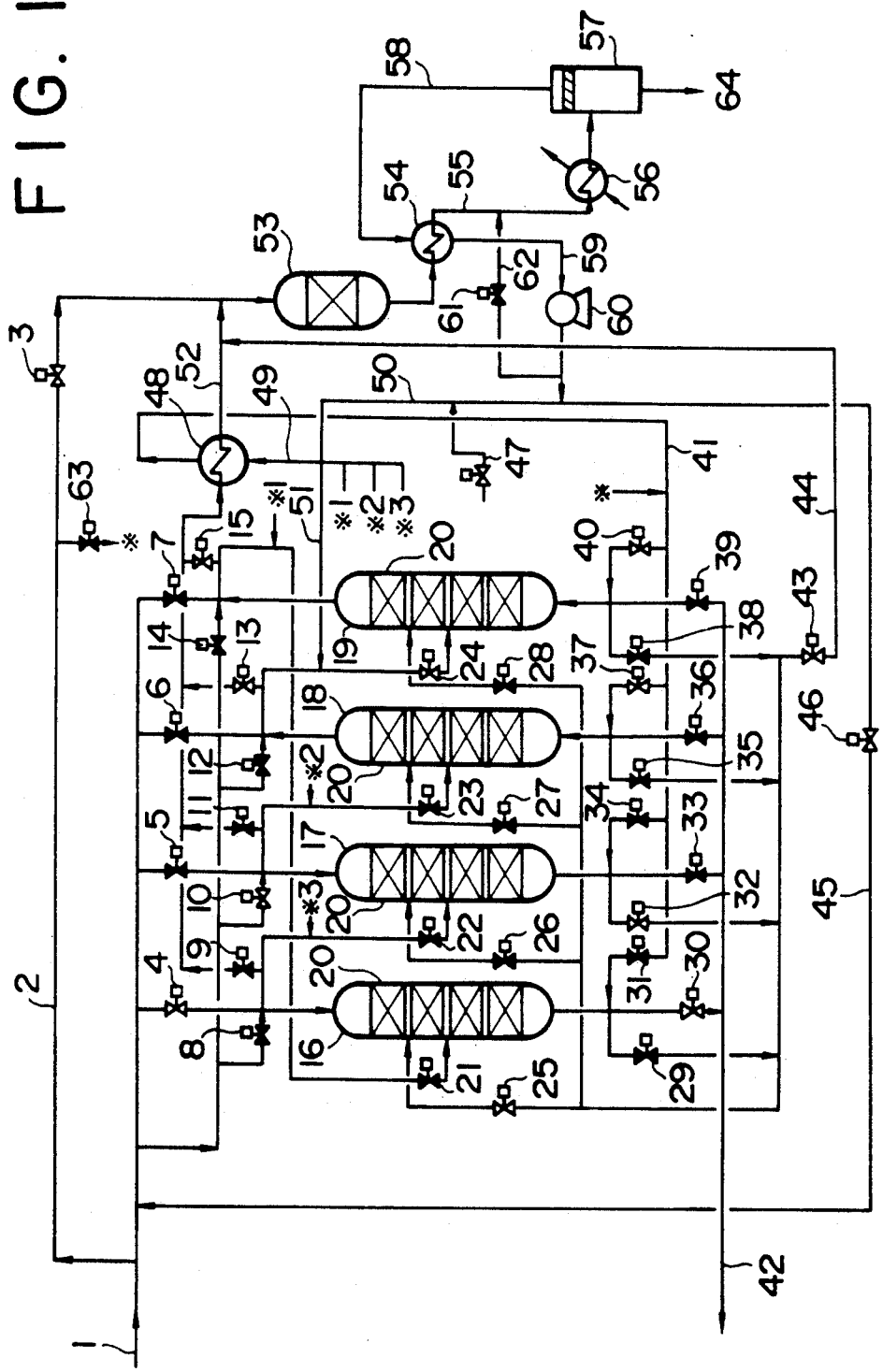
FIG. 1 shows flows in an embodiment of the present invention.

FIG. 1 shows an embodiment of the present invention.

Figure 2:
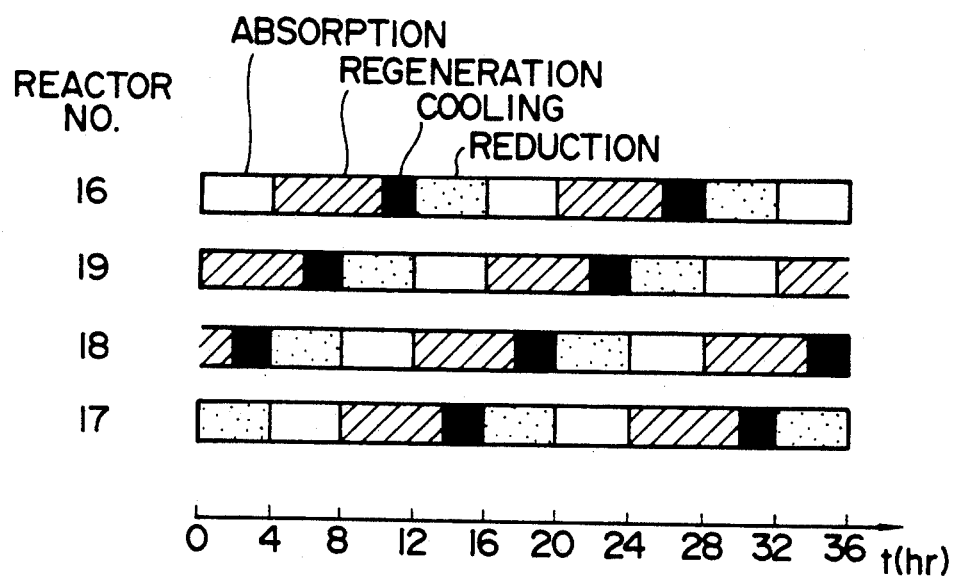
FIG. 2 shows a time schedule of the absorption and regeneration cycle in an embodiment of the present invention.

In FIG. 1, 1 and 2 indicate high-temperature gas lines for a high-temperature gas containing sulfur compounds such as H$_2$S and COS and removed of dust, and 3, 4, 5, 6, 7, 8, 10, 12 and 14 indicate flow switching valves for this gas. 9, 11, 13 and 15 indicate switching valves for a gas containing concentrated sulfur compounds from reactors in the regeneration step.

16, 17, 18 and 19 are reactors filled with an absorbent, and 20 is the absorbent.

21, 22, 23 and 24 denote flow switching valves for supplying an outlet gas from the reactors in the cooling step mixed with part of a circulating gas of relatively low temperature to the middle section of the reactors which are in the regeneration step.

25, 26, 27 and 28 indicate flow switching valves for supplying an outlet gas from the reactors in the reduction step to the middle section of the reactors in the absorption step.

29, 32, 35 and 38 denote flow switching valves for an outlet gas from the reactors in the reduction step, 30, 33, 36 and 39 indicate flow switching valves for a purified gas from the reactors in the absorption step, and 31, 34, 37 and 40 denote flow switching valves for supplying a regeneration gas to the reactors in the regeneration step.

41 denotes a circulation line for the regeneration gas, 42 a product line for taking out the purified gas, 43 a flow switching valve for a reducing gas, 44 a reducing gas line, 45 a branch line from a line 50 described below, 46 a flow switching valve for the branch line, and 47 a supply line for the air or a gas containing oxygen.

48 indicates a heat exchanger, 49 a branch line from a line 50 explained next, 50 a gas line for the residual gas after sulfur is removed from a gas containing a high concentration of sulfur compounds, 51 a branch line of the line 50, 52 a gas line for a cooled gas containing a high concentration of sulfur compounds, 53 a sulfur recovery device, 54 a heat exchanger, 55 a gas line, 56 a heat exchanger, 57 a sulfur separation device, 58 and 59 gas lines, and 60 a blower.

*1, *2 and *3 denote lines corresponding to the line 51.

FIG. 1 shows an embodiment of the present invention in which the reactors 16-19 with an identical structure filled with the absorbent 20 are switched, in turn, in the succession of the reduction step according to Equations (1) and (2), the absorption step according to Equations (3) and (4), and the regeneration step according to Equation (5).

The present invention is not restricted to the fixed bed type and can be applied to the fluidized bed type or to the moving bed type if a system in question uses a process in which the regeneration according to Equation (5) after the absorption and removal of sulfur compounds such as H$_2$S and COS with an absorbent is repeated. Also, the present invention can of course be used for the fixed bed type with more than four towers. Furthermore, although the composition and shape of the absorbent used are by no means restricted, Fe$_2$O$_3$ will be used for the absorbent here only to show an example.

A high-temperature reducing gas 1 produced, for example, by the gasification of coal is treated in a dust collector (not shown) to get rid of dust until the concentration of dust is about 10 mg/Nm$^3$. The reducing gas contains, depending on gasification conditions and the kind of coal used, several hundreds to several thousands ppm of H$_2$S, COS, NH$_3$ and halogen compounds besides dust, its temperature is about 250° to 500° C. because of heat recycling at the outlet of a gasification furnace (gasifier), and its pressure is between the atmospheric pressure and about 25 kg/cm$^2$G depending on the type of a gasification furnace employed.

FIG. 1 shows the system at the moment when the absorption step is carried out in the reactor 16, the reduction step in the reactor 17, and the regeneration step in the reactors 18 and 19.

Figure 3:
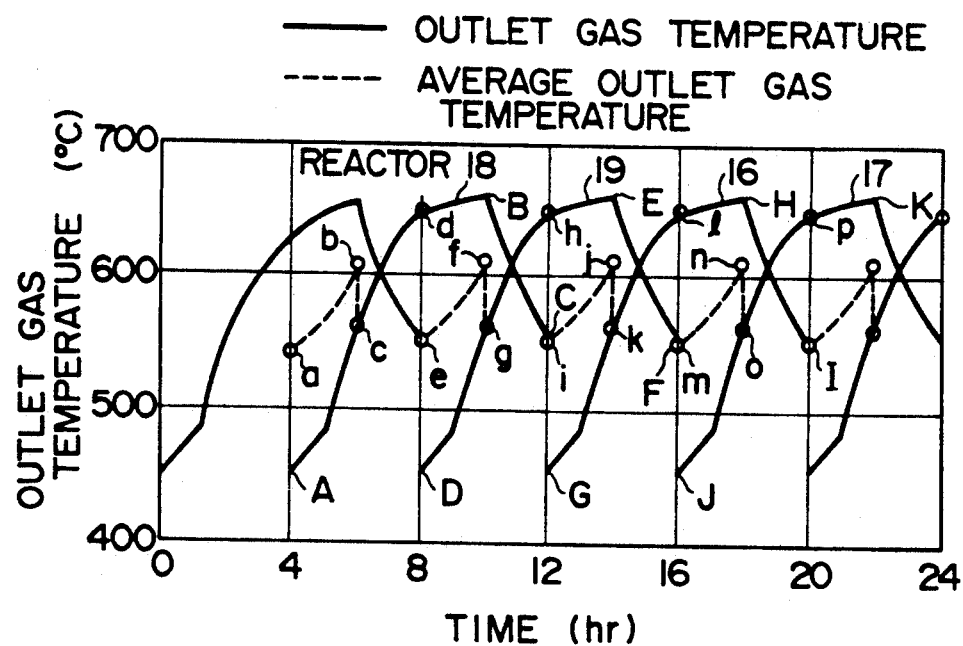
FIG. 3 shows an example of variation of the temperature of an outlet gas from a regeneration reactor as a function of time.

FIG. 2 is to show a time schedule of a cycle of the absorption, regeneration, cooling and reduction steps in an embodiment of the present invention. FIG. 3 shows an example of the time variation of gas temperature at the outlet of the reactor in the regeneration step when the temperature of the inlet gas is held at 450° C.

In FIG. 1, a gas 1 produced in a gasification process and treated for the removal dust is supplied to the reactor 16 through the switching valve 4. The sulfur compounds present in the gas are absorbed and removed by the absorbent 20 according to Equations (3) and (4) normally at about 300°-500° C. The gas thus purified is supplied, as a product gas 42, to a gas turbine in the downstream through a switching valve 30.

In the time schedule shown in FIG. 2, the reactor 18 is assumed, to show an example for the discussion below, to start its regeneration step four hours before the regeneration step of the reactor 19.

The reactor 19, which completed the absorption step, will begin the regeneration step. The air or a gas containing oxygen is supplied to the line 50 from the line 17 and, through the line 49 and the heat exchanger 48 and the line 41, fed to the reactor 19 via the switching valve 40. At this point of time the air or an oxygen-containing gas has already been supplied to the reactor 18 through the same route as above and through the switching valve 37.

Through the switching valves 13 and 15 and the heat exchanger 4S and the line 52, the gas used for the regeneration of the absorbent is led to the $SO_2$ reduction and sulfur recovery device 53, and then it is led to the sulfur separation device 57 through the heat exchanger 64 and the line 65 and the heat exchanger 56, and finally sulfur is discharged from a line 64.

Also, the gas from which sulfur has been separated is led into the line 50 through a route of the lines 58 and 59 and the blower 60. It is then mixed with the air or an oxygen-containing gas from the line 47 and heated in the heat exchanger 48 up to a temperature required for regeneration reactions via the lines 50 and 49, and it is finally returned to the circulation gas line 41.

The gas returned to the line 41 is led, through the switching valves 37 and 40, to the reactors 18 and 19, which are in the regeneration step. After contributing to the promotion of regeneration reactions, the gas becomes part of the circulating gas via switching valves 13 and 15 as explained above.

If the cycle of continuous desulfurization and regeneration is carried out according to the time schedule shown in FIG. 2, the reactor 18 is supplied with gases for 8 hours through the flow route described above and finishes the regeneration of the absorbent. Of this 8 hours, the regeneration is almost completed in the initial 6 hours, and during the remaining two hours the regeneration is brought further to completion and the absorbent is cooled.

The outlet gas from the cooling step in the reactor 18 has a higher temperature than the inlet gas temperature of the reactor. Part of the circulating regeneration gas from the blower 60 whose temperature is relatively low (200°–300° C.) is therefore mixed into this gas through the lines 50 and 51. After the temperature of this gas is cooled down approximately to the temperature of the inlet gas of the reactors 18 and 19, the gas is fed to the middle section of the reactor 19 via switching valve 24.

To the middle section of the reactor 19 the regeneration gas has been supplied through the switching valve 40 for two hours prior to the introduction of a cooling gas to the reactor 18 as above. The reactor 19 is regenerated with the same operations as in the case of the rector 18. That is, the gas from the line 41 is supplied through the switching valve 40 for 8 hours. Two hours after the beginning of the supply to the reactor 19, the gas for the cooling step in the reactor 18 is supplied via the flow switching valve 24 for two hours.

In the regeneration step, although the gas is supplied for 8 hours to the inlet of the reactor 19, during the final two hours the reactor undergoes the cooling step for cooling the reactor as described above. In this cooling step, the gas whose temperature is about the same as the relatively low temperature of the reactor inlet, flowing from the line 60 to the line 49, is led to the middle section of the reactor 16 from the line *1 through the flow switching valve 21. At this point of time, the reactor 16 has already been in the regeneration step for two hours. Thus, a series of regeneration and cooling steps are completed.

FIG. 3 shows the temperature of an outlet gas of the reactor in the regeneration step as a function of time as an example.

When operating the reactors independently of each other the temperature of the outlet gas at the beginning of the regeneration step is about the same as the temperature A of the inlet gas. As the regeneration progresses exothermic reactions between iron sulfide and oxygen and ensuing heat transfer bring the outlet gas temperature up to the temperature B. In this case the temperature difference between A and B is about 200° C.

In the method of the present invention, on the other hand, since two towers of the reactors in the regeneration step are operated in series, the temperature of the outlet gas shows the following variation in time.

At the reactor 19 in the regeneration step, the outlet gas temperature varies from D to E. At the point D where the reactor 19 starts the regeneration, the reactor 18 has been in the regeneration step for four hours and the temperature of the outlet gas from the reactor 18 has reached the point d. Therefore, a mixture of the outlet gases from the reactors 19 and 18 is fed to an inlet on the high-temperature side of the heat exchanger 48. The inlet gas temperature at the heat exchanger 48 shows the averaged temperature e between d and D.

As the regeneration in the reactors 18 and 19 progresses, the outlet gas temperature of each reactor increases and the inlet gas temperature of the high-temperature side of the heat exchanger 48 goes up. At the point B at which the regeneration in the reactor 18 is completed the highest temperature f is reached. Since the reactor 13 is switched to the cooling step and the cooled gas is fed in the middle section of the reactor 19, as the reactor 18 starts the cooling step the outlet gas temperature of the reactor 19 immediately becomes the temperature g. This outlet gas from the reactor 19 enters the heat exchanger 48 without mixing with other gases. Then, as the regeneration in the reactor 19 proceeds, the outlet gas temperature increases from g to h, and the gas enters the heat exchanger at this temperature. At the point when the outlet gas of the reactor 19 shows the temperature h, since the reactor 16 starts the regeneration, the inlet gas temperature on the high-temperature side of the heat exchanger 48 shows the average temperature i between h and G.

As the procedure described above is repeated, the inlet gas temperature on the high-temperature side of the heat exchanger 48 varies as i-j-k-l.

As shown in FIG. 3 and explained above, in the method of the present invention the fluctuation of the inlet gas temperature on the high-temperature side of the heat exchanger 48 is only about 120° C. and is much less than the case in which the reactor towers are operated independently of each other, and thus a stable operation becomes possible.

Furthermore, because two towers of the regenerating reactors are operated partly in series, the absorbent can be regenerated to the fullest extent, and we may safely prevent $O_2$ gas present in the outlet gas of the reactor already regenerated from entering the sulfur recovery system on the downstream side. The merits of these improvements are quite significant.

$SO_2$ gas generated in the reaction according to Equation (5) is removed in the next reduction step. While as a method of removing $SO_2$ the following can be considered: a method by an independent $SO_2$ reduction reaction, a method of collecting and removing sulfur as elemental sulfur by a combination of a $SO_2$ reduction reaction and the Claus reaction, and a wet method of collecting and removing sulfur as gypsum by reactions with coal can be considered; the present invention is not restricted to any specific method.

Here, we use, as an example, a method of removing and collecting sulfur as elemental sulfur by a combination of the reduction reactions according to Equations (14) to (17) below and the Claus reaction of Equation (18) and the hydrolysis of Equation (19).

$$SO_2 + 3H_2 \rightarrow H_2S + 2H_2O \tag{14}$$

$$SO_2 + 3CO \rightarrow COS + 2CO_2 \tag{15}$$

$$2SO_2 + 4H_2 \rightarrow S_2 + 4H_2O \tag{16}$$

$$2SO_2 + 4CO \rightarrow S_2 + 4CO_2 \tag{17}$$

$$2H_2S + SO_2 \rightarrow (3/x)S_x + 2H_2O \ (x=2-8) \tag{18}$$

$$COS + H_2O \rightarrow H_2S + CO_2 \tag{19}$$

Part of the gas produced by gasification and cleaned of dust can be used as the reducing gas required in $SO_2$ reduction reactions. This gas is supplied to the $SO_2$ reduction and sulfur recovery device 53 through the line 2 and the switching valve 3.

At this device $SO_2$ gas present in the line 52 after the regeneration step is turned into $H_2S$, COS and elemental sulfur according to Equations (14)-(17). Also, the reactions of Equations (18) and (19) are carried out, then the gas is cooled down to 130°-250° C. by the heat exchangers 54 and 56, and elemental sulfur 64 is collected and removed.

Thus, the treated gas from which most of $SO_2$ gas originally present has been removed is led to the line 58. It should of course be better if the reducing gas used here is the purified gasification gas in the line 42.

Part of the gas in the line 50 at the outlet of the blower 60 branches into the line 45 and is supplied to the reactor in the absorption step through the line 1 while taking the amount of reducing gas in the line 2, the amount of the air or an oxygen-containing gas supplied and the amount of elemental sulfur 64 removed and collected into consideration.

That is, since a gas in the line 59 from which $SO_2$ is removed in the $SO_2$ reduction and sulfur collection steps still contains some small amount of unreacted $SO_2$, $H_2S$, COS and gaseous sulfur, the gas is supplied to the reactor 16 in the absorption step from the line 46 through the switching valve 46 in order to maintain both a balance within the system and the progress of gas purification at the same time.

Also, in terms of heat balance, as seen from FIG. 3, at the beginning of the regeneration step the outlet gas mixture from the two towers of the reactors in the regeneration step marks the lowest temperature during the regeneration cycle, but it is still as high as about 550° C. Therefore, the temperature is held to be higher than a certain temperature (for example, 300° C.) required for reduction reactions, and heat balance in the regenerating system can be well maintained when gas flow is switched.

If the amount of high-temperature reducing gas flowing in the line 1 decreases when the load is low, or if low sulfur coal is used, it gradually becomes more difficult to balance the incoming and outgoing flows of heat at the regenerating system as the amount of FeS generated by the absorption reactions of Equations (3) and (4) in the absorbent becomes less than normal and the heat of the regeneration reactions decreases. If keeping the balance between the incoming and outgoing heat at the regenerating system becomes difficult as the load becomes less than a certain value (for example, less than 50%), a method of partly by-passing the Claus reaction system may be employed to counteract such situation. In this case, still the reactions for generating elemental sulfur partly occur with the $SO_2$ reduction system only, and sulfur is produced at a level of 50 to 70%, and residual $H_2S$ and sulfur vapor in the outlet gas from the reduction system contribute to the heat in the regenerating system by burning at the inlet or on the inside of the regenerating system.

Furthermore, the $SO_2$ reduction system by itself (without the Claus reaction system) can serve as a sulfur recovery system. With the reduction system only, even though the amount of residual $H_2S$ and sulfur vapor increases slightly, and the amount of the air necessary for regeneration increases by about 10% compared the case in which the Claus reaction system is involved because $O_2$ gas is burned and consumed, this does not present a significant problem with the system.

To switch the reactor 18, having finished the cooling step, to the reduction step, the switching valves 13, 24 and 37 are closed and the switching valves 12 and 35 are opened so that the gasification gas cleaned of dust in the line 1 is introduced. This way, the reduction reactions of Equations (1) and (2) are started.

Also, at the beginning of the reduction step, in order to treat a small amount of residual $SO_2$ gas in the reactor 18 with the device 53, the outlet gas from the reactor 18 is led to the middle section of the reactor 17, which has entered the absorption step, by opening the switching valve 26 and by closing the valve 43, after letting the gasification gas flow into the line 44 by opening the switching valve 43 for a short period of time prior to opening the switching valve 26, and after checking if $SO_2$ gas is indeed gone.

For the following reasons, the gas after the reduction reactions in the reactor 13 is not, as it is, mixed with the purified gas 42 through the switching valve 36.

It is because the reactions of Equations (20)-(26) below occur and sulfur compounds such as $SO_2$ and $H_2S$ are generated if the regeneration is incomplete because of low temperature inside the reactor 18 caused by operational or control errors in the regeneration step or because of sulfate accumulated in the absorbent 20 caused by the degradation of performance as time elapses.

$$FeSO_4 + \tfrac{4}{3}H_2 \rightarrow \tfrac{1}{3}Fe_3O_4 + SO_2 + \tfrac{4}{3}H_2O \tag{20}$$

$$Fe_2(SO_4)_3 + 10/3H_2 \rightarrow \tfrac{2}{3}Fe_3O_4 + 3SO_2 + 10/3H_2O \tag{21}$$

$$Fe_2(SO_4)_3 + 10H_2 \rightarrow 2FeS + SO_2 + 10H_2O \tag{22}$$

$$FeSO_4 + \tfrac{4}{3}CO \rightarrow \tfrac{1}{3}Fe_3O_4 + SO_2 + \tfrac{4}{3}CO_2 \tag{23}$$

$$Fe_2(SO_4)_3 + 10/3CO \rightarrow \tfrac{2}{3}Fe_3O_4 + 3SO_2 + 10/3CO_2 \tag{24}$$

$$Fe_2(SO_4)_3 + 10CO \rightarrow 2FeS + SO_2 + 10CO_2 \tag{25}$$

$$SO_2 + 3H_2 \rightarrow H_2S + 2H_2O \tag{26}$$

Although most of these sulfur compounds are absorbed and removed in the reduction step, part of them remain in the gas even after the reduction treatment and the concentrations of the sulfur compounds may be too high to ignore depending on the amount of sulfate accumulated in the absorbent 20. Therefore, the gas after the reduction treatment should not be mixed with the purified gas in the line 42 at the outlet of the absorption step.

When the reactor is switched to the reduction step, the temperature of the absorbent in the reactor is higher than the temperature of the high-temperature reducing gas by about 50° to 300° C. because of heat accumulation. This does not normally cause any ill effects on the perfect performance of the absorbent. Rather, this is preferred because the decomposition of sulfates by the high-temperature reducing gas is further promoted according to Equations (20)–(26) above as the temperature of the absorbent becomes higher when part of the absorbent has not been regenerated sufficiently during the regeneration step and sulfates has been produced.

The stability of absorption and regeneration performance is strongly desired and should be maintained in practical situations even if the load of the gasification furnace, the content of sulfur compounds and the amount of gas (which depends on the kind of coal used) being treated fluctuate.

For example, if the flow rate of the high-temperature reducing gas containing sulfur compounds such as $H_2S$ and COS decreases, or if low sulfur coal is used, the amount of FeS produced by the absorption reactions in the absorbent becomes less than usual and the load of the regeneration step is reduced. Therefore, if the regeneration reactions are carried out at a normal level of flow rate of the circulating gas, the reactions are finished in a short period of time and the heat generated by regeneration reduces as the regeneration step progresses. Therefore, since the outlet gas temperature and the temperature inside the reactor in the regeneration step become lower than those at the time of normal operation, supplementary heat is required in order to maintain a stable regeneration operation.

As a method for supplying additional heat, use may be considered of the heat of combustion between the gasification gas and oxygen by feeding the gasification gas in the line 1 containing combustible gas such as CO and $H_2$ from the outside of the system. Such use of the gasification gas consumes, however, CO, $H_2$ and the like that will be used on the downstream side from the Purification process and should be avoided from the viewpoint of improving the economy of the gas purification system.

Therefore, in order to maintain a stable and continuous operation even if the load is low, the circulation of a regeneration gas should be reduced and the reaction time for regeneration should be extended.

Although the circulating regeneration gas line at the time of low load is the same as when the load is normal, the following measure will be taken to protect the blower 60. Since the blower normally becomes overheated if cooling by a reduced amount of gas sucked in is insufficient, the amount of gas entering the blower should be constant. Therefore, as the amount of the circulating regeneration gas decreases, the same amount of gas is more or less secured at the blower 60 as in the case of normal loading by returning part of the gas in the line 59 after the collection and removal of sulfur to a point before the final sulfur condenser 56 through the switching valve 61 and the line 62.

If enough heat in the regenerating system is not obtained by adjusting the amount of the circulating regeneration gas as above, the high-temperature reducing gas can also be supplied to the inlet line 41 of the reactor in the regeneration step via the switching valve 63 so that additional heat is generated by combustion reactions of combustible gas such as $H_2$ and CO.

Furthermore, although the absorption and regeneration operations are done using flows counter to each other (reversed flows) in FIG. 1, these operations can also be carried out using flows in the same direction.

According to the method of the present invention, at least four towers of reactors filled with an absorbent are used, and of these four or more towers two are used as regeneration reactors. Abnormal accumulation of heat due to the heat of regeneration reactions ca be moderated by carrying out the regeneration operation partly in series, and the life of the absorbent may be extended at the same time. Also, fluctuations in the concentration of $SO_2$ gas in the regeneration reactors can be controlled, and the regeneration may be done sufficiently without allowing $O_2$ gas to mix into the sulfur recovery system in the downstream Thus, it becomes possible to continuously and stably absorb and remove sulfur compounds with an absorbent.

Figure 4:
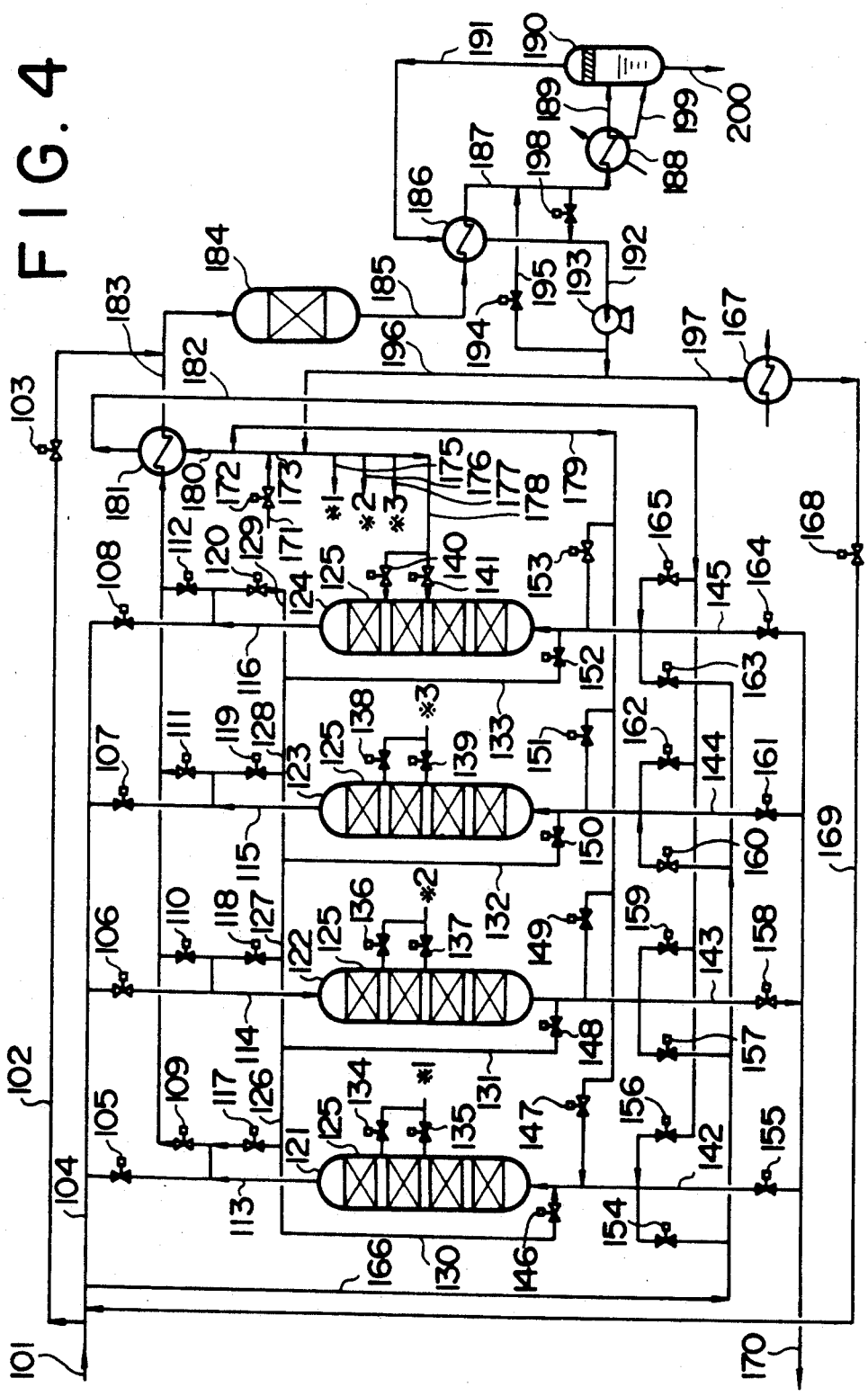
FIG. 4 shows flows in another embodiment of the present invention.

FIG. 4 shows another embodiment of the present invention.

In FIG. 4, 101, 102, 104 and 166 indicate a gas line for a high-temperature reducing gas which is already cleaned of dust and which contains sulfur compounds such as $H_2S$ and COS.

103, 105 to 108, 154, 157, 160 and 163 denote switching valves for this gas. 109 to 112 denote switching valves for the gas containing a relatively high concentration of sulfur compounds coming out of the reactors in the regeneration and reduction steps. 117 to 120 indicate switching valves for gas flow to let the high-temperature outlet gas of the regeneration reactors mix with the outlet gas of the reactor in the preliminary regeneration step. *1, *2, and *3 means that lines 175, 176, and 177 are respectively connected to *1, *2, and *3 of reactors 121, 122, and 123.

121 to 124 indicate reactors filled with a plurality of layers (four layers in this example) of an absorbent 125; and 134 to 141 denote flow switching valves for supplying part of a relatively cool circulating gas which does not contain oxygen to the third and fourth (from the inlet of a regeneration gas) layers in the reactors in the regeneration step, 155, 158, 161 and 164 indicate flow switching valves for purified gas from the reactors in the absorption step; 156, 159, 162 and 165 indicate flow switching valves for supplying a regeneration gas to the reactors in the regeneration step; and 147, 149, 151 and 153 denote flow switching valves for supplying a cool gas containing oxygen to the reactors in the preliminary regeneration step. Lines 131, 132, and 133 are lines similar to line 130; 148, 150, and 152 are switching valves positioned on lines 131, 132, and 133, respectively. 142, 143, 144, and 145 are connecting lines. Lines 113, 114, 115 and 116 are gas lines connected to the reactors as shown.

170 indicates a product line for the purified gas; 182 a circulation line for regeneration gas; and 169 a branch line from a gas line 196 which will be explained below.

168 indicates a flow switching valve for this gas line 196; 171 a supply line for supplying the air or an oxygen-containing gas; and 172 its flow switching valve.

167, 181 and 186 denote heat exchangers; 173 and 174 a branch line from the gas line 196; 175 to 178 branch lines from the gas line 196; 179 and 180 branch lines from a mixed flow of a gas in the line 173 and the air or an oxygen containing gas from the supply line 171; and 183 a cooled gas line which holds a relatively high concentration of sulfur compounds.

188 indicates a SO₂ reduction reactor; 188 a sulfur condenser; 187, 189, 191, 192, and 195 to 197 gas lines; 190 a sulfur mist separator; 193 a blower; 198 a flow switching valve for by-passing the sulfur condenser 188; and 199 and 200 liquid sulfur (collected sulfur) lines.

In FIG. 4 an embodiment is shown in which reactors 121-125 filled with an absorbent and having an identical structure are switched from the reduction step according to Equations (1) and (2), to the absorption step according to Equations (3) and (4), and to the regeneration step according to Equation (5). The present invention is not restricted to the fixed bed type, and the fluidized bed and moving bed types can also be employed if an entire process repeats regeneration according to Equation (5) after absorption and removal of sulfur compounds such as $H_2S$ and COS in a reducing gas with an absorbent. Also, it can of course be applied to the fixed bed type with more than four towers.

Furthermore, although the present invention is by no means restricted to any specific composition and shape of an absorbent, we will use an absorbent of $Fe_2O_3$ as an example for explaining.

A high-temperature reducing ga containing sulfur compounds such as $H_2S$ and COS in the line 101 is a gas produced by gasification which has already been cleaned of dust to a dust concentration of about 10 mg/Nm³. This reducing gas contains, besides dust, about several tens to several thousands ppm of $H_2S$, COS, $NH_3$, halogen compounds and the like. Its gas temperature is about 250°500° C. due to heat recycling at the outlet of a gasification furnace, and its pressure is normally between the atmospheric pressure and 25 kg/cm²G although it actually depends on a shape of a gasification furnace.

FIG. 4 shows a situation in which the reactor 121 is in the preliminary regeneration step, the reactor 122 in the absorption step, the reactor 123 in the reduction step, and the reactor 124 in the regeneration step.

FIG. 5 shows an example of a time schedule of the absorption, preliminary regeneration, regeneration, cooling and reduction steps in an embodiment of the present invention.

Here, for the purpose of the following explanation, the absorption, preliminary regeneration, regeneration, cooling and reduction steps and the sulfur recovery process are assumed to be carried out under almost the same pressure as the gasification gas cleaned of dust in the line 1 (about the atmospheric pressure to 30 kg/cm²G) for the system of FIG. 4 under the schedule in FIG. 5.

In FIG. 4, the gasification gas in the line 1 which has already been cleaned of dust is supplied to the reactor 122 through the flow switching valve 106, and the sulfur compounds in the gasification gas is absorbed and removed by the absorbent 125 normally at about 300°-500° C. according to the reactions of Equations (3) and (4), and then the gas is supplied to a gas turbine (not shown) through the switching valve 158 and from the line 170 as a purified gas.

During the preliminary regeneration step, the gas which has finished the regeneration step in the reactor 124 is led to the reactor 121 through the line 116, the switching valve 120, the lines 129, 127, 126 and 130, and the switching valve 146.

For a certain period of time after switching from the absorption step to the preliminary regeneration step (or from the preliminary regeneration step to the regeneration step), the outlet gas temperature of the reactor 121 is not very much different from or is slightly higher (by as much as several tens of degrees Celsius at the most) than the temperature of the gasification gas in the line 101. Therefore, if the inlet regeneration gas temperature in the regeneration step needs to be equal to or higher than the temperature of the gasification gas in the line 1, the inlet regeneration gas temperature practically cannot be maintained at a given temperature (about 400°-500° C., for example) only with the heat exchanger 181 in the downstream.

In such a case, in order to maintain the temperature of the inlet gas on the high-temperature side at a given temperature (about 450°-550° C.), a necessary amount of the high-temperature outlet gas of the reactor 124 ma be mixed into the gas line 113 through the switching valve 117 and can be led to the heat exchanger 181 via the switching valve 109.

The residual high-temperature outlet gas of the reactor 124 is sent through the line 130 and the switching valve 146. To this gas the oxygen-containing cool gas, which is sent from the branch line 179 of the gas line 180 through the switching valve 147, is mixed. Then the mixture is led to the reactor 121 to control the regeneration inlet gas temperature of the preliminary regeneration step.

As a result, the absorbent 125 in the reactor 121 can be protected from an abrupt temperature rise, and a contribution can be made to stabilize the inlet gas temperature on the high-temperature side of the heat exchanger 181.

As a matter of course, depending on how the regeneration step in the reactor 124 and the preliminary regeneration step in the reactor 121 progress, the temperatures of the outlet gases from the reactors 121 and 124 vary. Therefore, the amount of the outlet gas of the reactor 124 which is led to the outlet gas from the reactor 121 is controlled in a range of about 0-70%, and the temperature of the inlet gas on the high-temperature side of the heat exchanger 181 is controlled to be higher than a given temperature (500° C., for example).

The reactor 123 is in the reduction step. The gas for reduction is led into the reactor 123 through the gas line 166 branched from the gas line 104 and via the switching valve 160.

The outlet gas of the reactor 123 containing SO₂ merges with the gas after the preliminary regeneration treatment through the gas line 115 and the switching valve 111, and is cooled by the heat exchanger 181 and led into the sulfur recovery system so that a certain type of sulfur is collected.

Also, the flow rate of the gas 166 for reduction is adjusted to about 0.5-5% of that of the gasification gas in the line 101.

The gas which has passed through the sulfur recovery system is branched into the gas lines 173 and 174 through the gas line 196.

The air or an oxygen-containing gas is mixed into the gas line 173 through the line 171 and the switching valve 172, and most of this gas (about 1-3 volume % as oxygen concentration) is sent to the heat exchanger 181 from the line 180. Here, after the gas is heated up to a given temperature (about 400°-500° C.) required for regeneration, the gas is returned to the reactor 124 through the gas line 182 and the switching valve 165 to be circulated and regenerated.

As shown in the time schedule in FIG. 5, if a cycle of continuous absorption and regeneration is formed, the third and fourth (from the inlet side of the regeneration gas) layers of the absorbent 125 may be exposed to the heat of regeneration reactions in some cases. In such cases, the following operations will be carried out in order to cool the respective absorbent in the reactor whose temperature goes up in the regeneration step down to a temperature of about 600°-800° C.

That is, the gas in the gas line 196 which has passed through the sulfur recovery system is led to the third and fourth (or, the third or the fourth; from the inlet side of the regeneration gas in any case) layers in the reactor 124 through the switching valves 140 and 141 via the branch line 178 of the gas line 174.

This gas contains no oxygen and is at a temperature of about 150°-300° C. This is considerably lower than the temperature of the regeneration inlet gas in the regeneration step. It is thus able to provide a cooling effect to the third and fourth layers of the absorbent 125 in reactor 124.

By cooling the high-temperature part of the absorbent 125 using this cooling method, damage to the carrier of the absorbent 125 and sintering of Fe and the like may be avoided for the benefit of extending the life of the absorbent very effectively.

Also, in the preliminary regeneration step, an oxygen containing cool gas is supplied to the reactor 121 through the branch line 179 of the gas line 180 and the switching valve 147, and the regeneration reactions are partly carried out here.

Since the $O_2$ concentration of the inlet gas of the reactor 121 is only about a quarter to a half compared to the inlet gas temperature of the reactor 124, and the temperature rise due to the heat of regeneration reactions can be moderated and the absorbent 125 may be protected from the abrupt temperature rise.

The outlet gas of the reactor 121 is led to the heat exchanger 181 via the gas line 113 and the switching valve 109, and the reduction treatment (sulfur collection) of $SO_2$ in the gas is carried out at the sulfur recovery system.

When the preliminary regeneration step is finished at the reactor 121, it is switched to the regeneration step. At the same time the reactor 122 is switched to the preliminary regeneration step, the reactor 123 to the absorption step, and the reactor 124 to the reduction step.

Since the reactor 121 has finished the preliminary regeneration step by this time, it can be switched to the regeneration step without any abrupt temperature rise.

The present invention, as described above, employs a method of supplying the amount which depends on the gas temperature at the moment of the high-temperature gas which has gone through regeneration reactions to the high-temperature outlet gas line of the preliminary regeneration step, and the fluctuation of the inlet gas temperature on the high-temperature side of the heat exchanger 181 can therefore be held small, ensuring stable operation.

Since the reactors in the regeneration and preliminary regeneration steps are operated completely in series, the regeneration of the absorbent can be done sufficiently, and $O_2$ gas in the outlet gas of the reactor after regeneration can safely be prevented from entering the sulfur recovery system to great advantages.

Also, if the flow rate of the high-temperature reducing gas in the line 101 is small when the load is low, or if the low sulfur coal is used, the amount of FeS generated by the absorption reactions of Equations (3) and (4) in the absorbent becomes less than normal, and the heat balance in the regenerating system becomes gradually more difficult to maintain.

If the load becomes less than a given value (50%, for example) and keeping the heat balance becomes difficult, a method may also be employed of partly by-passing the sulfur condenser 188 in the sulfur recovery system to counter such situation. This is a method of letting the gas after the $SO_2$ reduction reactions through the line 185 and the heat exchanger 186 take a by-pass from the gas line 187 to the inlet gas line 192 of the blower 193 through the switching valve 198.

In this case, the by-passing gas contains sulfur components such as $H_2S$ and gaseous sulfur. These sulfur components contribute to the heat in the regenerating system by burning in the reactors or at the inlet of the regeneration reactor.

Also, even if load fluctuations of a gasification furnace (gasifier) and/or changes in the kinds of coal used cause the amount of the gas to be purified and the content of sulfur compounds to also fluctuate, it is strongly desired for the absorption performance and the regeneration performance to remain stable in practical situations.

For example, if the amount of the high-temperature reducing gas in the line 101 which contains sulfur compounds such as $H_2S$ and COS decreases, or if low sulfur coal is used, the amount of FeS generated in the absorbent in the course of the absorption reactions becomes less than normal, and thus the load decreases in the regeneration step.

Therefore, if the regeneration reactions are carried out with the same amount of the circulating gas as in the case of normal load, the reactions are finished in a shorter period of time, and the heat of the regeneration reactions decreases as the regeneration step progresses.

Therefore, the temperature inside the reactor and that of the outlet gas become low compared to those at the time of normal loading, and thus it becomes necessary to supply additional heat to maintain a stable regeneration operation.

As a method for supplying additional heat, it is considered that the high-temperature reducing gas purified of dust and containing combustible gas such as CO and $H_2$ in the line 101 can be supplied from the outside of the system so that the heat of combustion between this gas and oxygen is utilized.

However, such use of the high-temperature reducing gas should be avoided in terms of economy of the gas purification system because CO and $H_2$, which are to be used in the downstream after gas purification, are consumed wastefully. Therefore, in order to maintain stable and continuous operation even when the load is low, the amount of circulation of the regeneration gas should be reduced to extend the time for regeneration reactions. With this, most cases may be dealt with.

Although the circulating regeneration gas line is the same as in the case of normal loading even if the load is low, the following measure is taken to protect the blower 193.

Since the blower normally becomes overheated if the amount of gas sucked in is reduced providing insufficient cooling, the amount of gas entering the blower should be kept constant.

Therefore, as the circulation of the regeneration gas decreases, the same amount of gas is more or less secured at the blower 193 as in the case of normal loading by returning part of the gas in the line 192 after the collection and removal of sulfur to a point before the final sulfur condenser 188 through the switching valve 194 and the line 195.

If enough heat in the regenerating system is not obtained by adjusting the amount of the circulating regeneration gas as above, the high-temperature reducing gas can also be supplied to the inlet line of the reactor in the regeneration step so that additional heat is generated by the combustion reaction of combustible gas such as $H_2$ and CO.

Furthermore, although the absorption and regeneration operations are done using flows counter to each other (reversed flows) in FIG. 4, these operations can also be carried out using flows in the same direction.

According to the method of the present invention, at least four towers of reactors filled with an absorbent are used, and the five steps of absorption, preliminary regeneration, regeneration, cooling and reduction are employed, and of these five steps the preliminary regeneration and regeneration and cooling steps are carried out completely in series so that abnormal accumulation of heat due to the heat of regeneration reactions can be moderated, and the life of the absorbent may be extended at the same time. Also, recycling heat in the high-temperature outlet gas of the regeneration reactor contributes to the stabilization of the inlet gas temperature of the regeneration reactor.

We claim:

1. In a method for absorbing and removing sulfur compounds present in a high temperature reducing gas with an absorbent, the improvement which comprises,
   a) contacting the gas with an absorbent to absorb and remove the sulfur compounds;
   b) subjecting the absorbent from step a) to a preliminary regeneration step;
   c) subjecting the absorbent from step b) to a regeneration step;
   d) cooling the absorbent from step c) by passing a cooling gas therethrough; and
   e) subjecting the absorbent from step d) to reduction by contacting it under reducing conditions with the reducing gas;

wherein step a) through e) are carried out in identical sequences in each of at least four connected reactors containing absorbent;

the sequence of the steps being staggered from one reactor to another such that the preliminary regeneration step in one reactor is initiated prior to the completion of the regeneration step of another reactor and wherein gas from an outlet of the regeneration step from said another reactor is mixed with gas outletting from a preliminary regeneration step of said one reactor and passed in heat exchange with the inlet gas of said regeneration step, whereby the variation in the gas outlet temperature during the regeneration step in each reactor is decreased.

2. In a method for absorbing and removing sulfur compounds present in a high temperature reducing gas with an absorbent, the improvement which comprises said method, including:

an absorption step for absorbing and removing the sulfur compounds with an absorbent;

a preliminary regeneration and regeneration step for regenerating the absorbent;

a cooling step subsequent to said regeneration step; and a reduction step for reducing the regenerated absorbent until the concentration of the high temperature reducing gas is the same at the upstream and downstream sides of the absorbent;

said regeneration and preliminary regeneration steps being carried out in at least four connected reaction towers; and wherein gas from an outlet of the regeneration step is mixed with gas from an outlet of the preliminary regeneration step so as to continuously recycle the heat of regeneration from the reactions and wherein elemental sulfur is recovered by feeding a gas containing $SO_2$ generated in the preliminary regeneration step, the regeneration and the reduction steps to a sulfur recovery system.

* * * * *